United States Patent
Snyder

(10) Patent No.: US 8,650,263 B2
(45) Date of Patent: *Feb. 11, 2014

(54) MANAGING SEARCHES ON MOBILE DEVICES

(75) Inventor: Kevin H. Snyder, Charlotte, NC (US)

(73) Assignee: Oracle International Corporation, Redwood Shores, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/170,285

(22) Filed: Jun. 28, 2011

(65) Prior Publication Data

US 2011/0302154 A1 Dec. 8, 2011

Related U.S. Application Data

(63) Continuation of application No. 11/509,173, filed on Aug. 23, 2006, now Pat. No. 7,996,487.

(51) Int. Cl.
*G06F 15/173* (2006.01)

(52) U.S. Cl.
USPC .......................... 709/217; 709/204; 707/770

(58) Field of Classification Search
None
See application file for complete search history.

(56) References Cited

U.S. PATENT DOCUMENTS

| | | | |
|---|---|---|---|
| 6,490,575 B1 | 12/2002 | Berstis | |
| 6,944,612 B2 | 9/2005 | Roustant et al. | |
| 7,003,514 B2 | 2/2006 | Dutta et al. | |
| 7,269,629 B2 * | 9/2007 | Zmudzinski et al. | 709/207 |
| 7,509,315 B1 | 3/2009 | Alpert et al. | |
| 2002/0019238 A1 | 2/2002 | McDonnell et al. | |
| 2003/0065774 A1 * | 4/2003 | Steiner et al. | 709/225 |
| 2003/0187841 A1 | 10/2003 | Zhang et al. | |
| 2004/0030690 A1 * | 2/2004 | Teng et al. | 707/3 |
| 2004/0111519 A1 * | 6/2004 | Fu et al. | 709/229 |
| 2005/0071766 A1 | 3/2005 | Brill et al. | |
| 2005/0131872 A1 * | 6/2005 | Calbucci et al. | 707/3 |
| 2005/0149496 A1 * | 7/2005 | Mukherjee et al. | 707/3 |
| 2007/0066292 A1 | 3/2007 | Benco et al. | |
| 2007/0130370 A1 | 6/2007 | Akaezuwa | |
| 2007/0185768 A1 | 8/2007 | Vengroff et al. | |
| 2007/0198338 A1 | 8/2007 | Heywood | |
| 2007/0230393 A1 * | 10/2007 | Sinha et al. | 370/328 |
| 2009/0024316 A1 | 1/2009 | Sutanto | |

OTHER PUBLICATIONS

Lindemann et al., "A Distributed Search Service for Peer-to-Peer File Sharing in Mobile Applications," Proceedings of the Second Interntaional Conference on Peer-to-Peer Computing (P2P'02), IEEE, 2002, 8 pages.

* cited by examiner

*Primary Examiner* — Ario Etienne
*Assistant Examiner* — Clayton R Williams
(74) *Attorney, Agent, or Firm* — Kilpatrick Townsend & Stockton LLP

(57) ABSTRACT

This disclosure pertains to solutions, including without limitation, systems, methods, and software programs, that provide the ability to quickly and efficiently search mobile devices for relevant information. An exemplary search server has the ability to communicate (either directly and/or via a host PC) with one or more mobile devices to transmit a search request. The mobile devices, in turn, have a search facility that is configured to perform a search of the contents of the device and return a set of results to the search server. These results then may be presented to a user, who can select one or more of the results. The selected search result(s) then may be downloaded from the device and presented to the user.

23 Claims, 7 Drawing Sheets

MANAGING SEARCHES ON MOBILE DEVICES

This application is a continuation of U.S. patent application Ser. No. 11/509,173, filed Aug. 23, 2006, now U.S. Pat. No. 7,996,487 entitled "MANAGING SEARCHES ON MOBILE DEVICES," which is hereby incorporated by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates in general search technology and in particular to performing searches of information stored on mobile devices.

BACKGROUND OF THE INVENTION

As our world becomes ever-increasingly connected, the importance of data access is likewise ever increasing. Merely by way of example, a current focus of the computer industry is in the field of "enterprise search," in which a single search facility (e.g., a search server, a distributed search service, etc.) can provide search capabilities across a variety of computers on an enterprise network. Merely by way of example, Oracle Secure Enterprise Search 10g™, available from Oracle Corp., provides the ability to search and locate public, private and shared content across a variety of enterprise data sources, including without limitation intranet web servers, databases, files on users' local disks and/or file servers, email message stores, document management systems, applications and portals.

However, enterprise users have an increasing number of mobile computing options, which provide the abilities for users to store data on mobile devices, which traditionally have not had visibility to enterprise search services, due in part to their transient nature. Merely by way of example, many users have handheld email devices (such as the Blackberry™ from Research in Motion, Ltd. and other such devices) on which they store important data, including without limitation documents, electronic mail messages, portable databases, and the like. Similarly, many wireless phones (such as CDMA phones, GSM phones, and the like) have become capable of storing similar data. Personal digital assistants ("PDA") are also capable of storing such data—some PDAs are network-connected (e.g., support Internet protocol ("IP") communications via cellular links, 802.xx links and/or the like), while others are not (i.e., require a connection, such as Bluetooth, serial, or universal serial bus ("USB") to a PC in order to exchange data). (These devices, collectively, are described herein as "mobile devices," a term that should be interpreted to include any handheld device capable of storing data and communicating, either directly or via a host PC, with a network.)

One thing all of these mobile devices, and others, have in common is that they are likely to hold information that may be useful to the enterprise. Unfortunately, however, there currently exists no feasible solution for searching such devices for relevant data. One workaround for this problem is to synchronize the data on the mobile device with a networked computer, such as a PC, a file server, or the like. This synchronized data, then, may be searched using an enterprise search service.

This workaround, suffers several drawbacks. First, it requires additional configuration of the device and therefore additional administrative overhead. Second, it is difficult to ensure that the "synchronized" data is in fact synchronized, and that the copies of the files, etc. on the networked computer are as current as those on the mobile device. Third, there is a significant likelihood that the synchronization will be incomplete, meaning that there are files or other information on the mobile device that have not been copied to the networked computer. Finally, many mobile devices (including, as one particular example, wireless phones) feature limited (or no) data synchronization capabilities, meaning that such devices are essentially left out of the enterprise search net.

Hence, it would be useful if there were some facility that provided the ability to search the mobile devices themselves for data matching an enterprise search query.

BRIEF SUMMARY OF THE INVENTION

Embodiments of the invention offer solutions, including without limitation, systems, methods, and software programs, that provide the ability to quickly and efficiently search mobile devices for relevant information. In an aspect of some embodiments, a search server has the ability to communicate (either directly and/or via a host PC) with one or more mobile devices to transmit a search request. The mobile devices, in turn, have a search facility that is configured to perform a search of the contents of the device and return a set of results to the search server. These results then may be presented to a user, who can select one or more of the results. The selected search result(s) then may be downloaded from the device and presented to the user.

Merely by way of example, one set of embodiments provides systems, including without limitation systems for retrieving information from a mobile device. An exemplary system might comprise a computer system and a plurality of mobile devices. The computer system, in an exemplary embodiment, comprises a first communication interface, a first processor in communication with the interface, and a first set of instructions executable by the first processor.

This first set of instructions might comprise, instructions to establish communications (e.g., via the first communication interface), with a set of mobile devices, which includes a first mobile device. There are further instructions to receive a search query (e.g., from a user, from an application, etc.). Based on the search query, a search request is transmitted to the set of mobile devices. In some cases, the computer system has further instructions to receive a set of search results from at least the first mobile device and/or to provide the set of search results to a user.

In this exemplary embodiment, the plurality of mobile devices comprises the set of mobile devices, including the first mobile device. The first mobile device might comprise a second communication interface and/or a second processor in communication therewith. The first mobile device might also comprise a set of instructions executable by the second processor. These instructions can include, merely by way of example, instructions to receive the search request from the computer system. The instructions can also include instructions to perform a search of information on the first mobile device, to prepare the set of search results based on the search and/or to transmit the set of search results for reception by the computer system.

Another exemplary system comprises a computer system comprising a communication interface, a processor in communication with the communication interface, and a set of instructions executable by the processor. The set of instructions includes, merely by way of example, instructions to establish (e.g., via the communication interface) communication between the computer system and a set of one or more mobile devices, and/or instructions to receive a search query. The search query might pertain to data stored on at least one of the mobile devices. Thus, there are, in some cases, instructions to perform a search of information about the data stored on the at least one mobile device, based on the search query, and/or instructions to provide a set of search results responsive to the search query.

Other embodiments provide methods, including without limitation methods that can be performed by systems of the invention and/or that are provided as computer software with instructions executable by a computer system. Merely by way of example, an exemplary method of searching information on a mobile device might comprise establishing communication between a computer system and a plurality of mobile devices. In some embodiments, the method further comprises receiving, at the computer system, a search query, which pertains to data stored on at least one of the mobile devices and/or performing a search of information about the data stored on the at least one mobile device, based on the search query. A set of search results responsive to the search query may then be provided to a user.

Still other embodiments of the invention provide software programs, including without limitation software programs that comprise instructions implementing methods of the invention and/or software programs that may be used to configure systems of the invention.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

Embodiments of the present invention provide heretofore unknown search services for mobile devices. In an aspect of some embodiments, a search service (which might be an enterprise search application configured to provide searching across an enterprise) receives a search query (e.g., from a user, an application, etc.) and use that search query to prepare a search request, which is used to search a set of information about data on one or more mobile devices. In some cases, this search is performed by transmitting a search query to the mobile device(s). In other cases, the search service might maintain a local cache of information about the data on various devices.

In an embodiment of the invention, a set of search results is produced and, optionally, provided to the requesting user, application, etc. In a particular aspect, the results are provided as a list of hyperlinks, possibly with additional meta-data about the file (or other data) referenced by each hyperlink. The user can select the hyperlink (e.g., in a web browser or any other application supporting the hypertext transfer protocol ("HTTP")) for the desired file/data, and the search service then will obtain the file/data and provide it to the user.

Beneficially, embodiments of the invention provide the ability for users (and/or applications, etc.) to search the contents of mobile devices, perhaps within the context of an enterprise search. This feature allows heretofore unavailable access to data, ensuring that an enterprise search will not fail to find relevant files and/or data simply because that information is stored in a mobile device, rather than on a traditional server or connected PC.

Figure 1A:
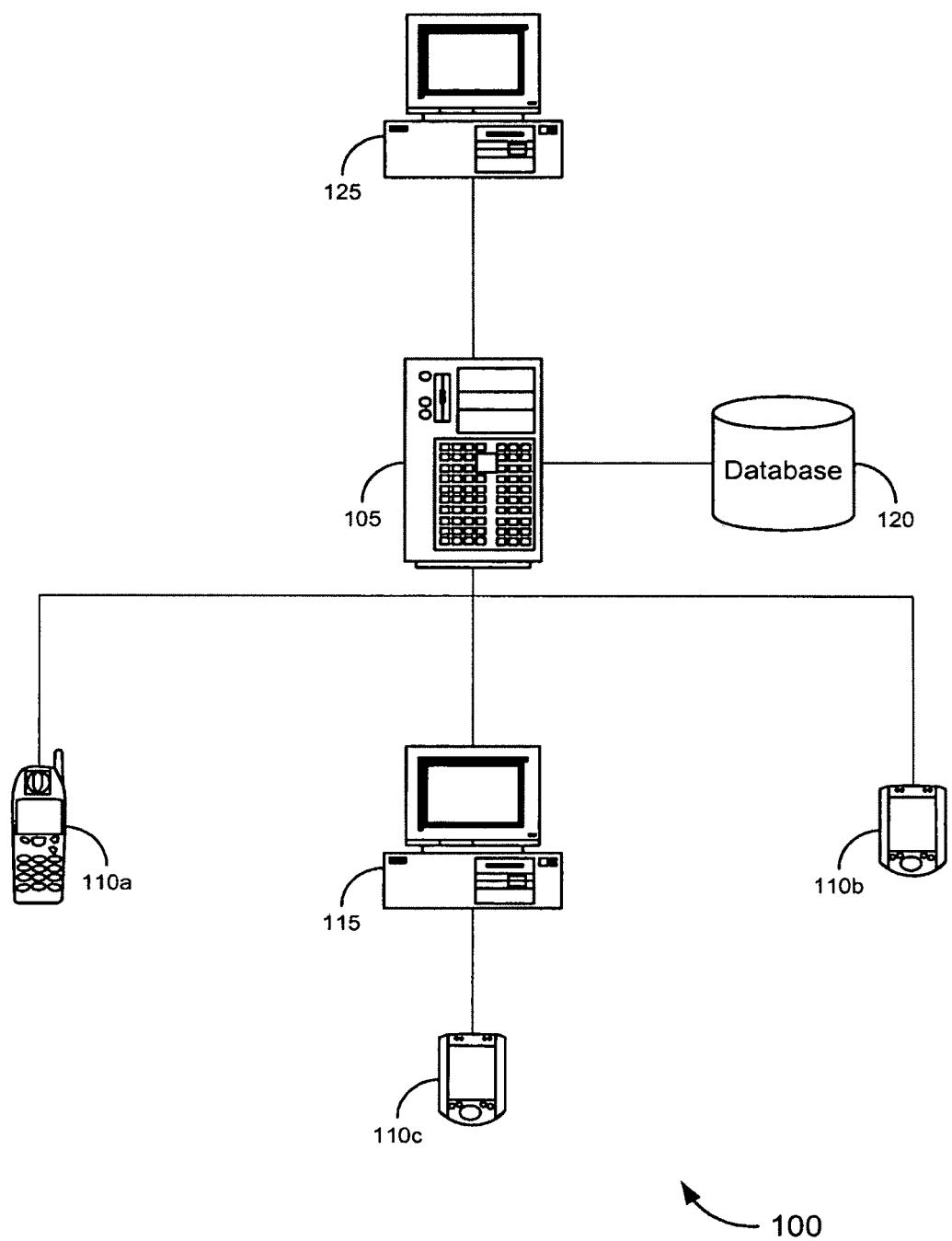
FIG. 1A is a block diagram illustrating a system for searching information on mobile devices, in accordance with various embodiments of the invention.

One set of embodiments provides systems for performing searches of information on mobile devices. An exemplary system 100 is illustrated by FIG. 1A. The system 100 comprises a search server 105 and one or more mobile devices 110, which are in communication, at least intermittently, with the server 105. The mobile devices 110 can be any of a variety of mobile devices, including wireless phones 110a (such as CDMA phones, GSM phones, etc.), handheld email devices 110b, PDAs 110c, tablet PCs and laptops (not shown), to name but a few examples. As described in further detail below, some of the mobile devices (e.g., 110a, 110b) may be in direct (e.g., IP) communication with the server 105, while other devices (e.g., 110c) may be in communication via a host PC 115, which provides connectivity between the mobile device 110c and the server 105. (It should be noted that, while the PDA 110c is illustrated as being connected with the server 105 via a host PC 115 and the wireless phone 110a and the wireless email device 110b are illustrated as having a direct connection, this arrangement is exemplary in nature; thus in some embodiments, a PDA 110c might have a direct connection with the server 105, while a wireless phone 110a and/or wireless email device 110b might be connected through a host PC 115.)

One skilled in the art will appreciate that the terms "direct connection" and "direct communication," as used herein, are not intended to mean that the mobile devices 110 are coupled directly to the server 105. Rather, such devices 110 will be in communication with the server 105 through a variety of means, such as a wireless phone network (in the case of a wireless phone 110*a*), as well as other network apparatus, such as routers, firewalls, etc., all of which can be conventionally implemented and need not be described in detail herein. Hence, the terms "direct connection" and "direct communication" merely indicate that the mobile devices 110 are capable of communicating with the server 105 (typically, but not necessarily, using IP) without the need for an intermediating host PC 115. Hence, such devices typically will provide some type of wired (e.g., Ethernet, etc.) and/or wireless (e.g., 802.xx, WiFi, WiMax, cellular, etc.) communication facility.

In contrast, non-network-connected devices, such as the exemplary PDA 110*c*, may not be capable of (or, in other situations, may not be configured to) support any network interface and/or protocol that would allow direct communication with the server 115. Instead, such devices (e.g., 110*c*) might merely be capable of communicating (or configured to communicate) with a host PC, using a local communication facility, such as an infrared link, a Bluetooth link, a serial link and/or a USB link.

Some devices 110 may be configured to support connectivity with the server 105 both directly (as that term is used herein), and through a host PC 115. In such cases, embodiments of the invention can support either type of connectivity.

The search server 105 might also include (and/or be in communication with) a database 120 and/or some other data store, which can be used, as described in further detail below, to store cached information about data on the mobile devices 110, as well as cached search results (which can include links or references to files and/or data on the mobile devices, as well, in some cases, as copies of the files and/or data themselves). The server 105 may also be in communication with one or more clients 125. Specifically, the server 105, in some cases, receives search queries from the client(s) 125 and/or provides search results (including both lists of files/data matching the search criteria and/or the files/data themselves) to the client(s) 125.

Figure 1B:
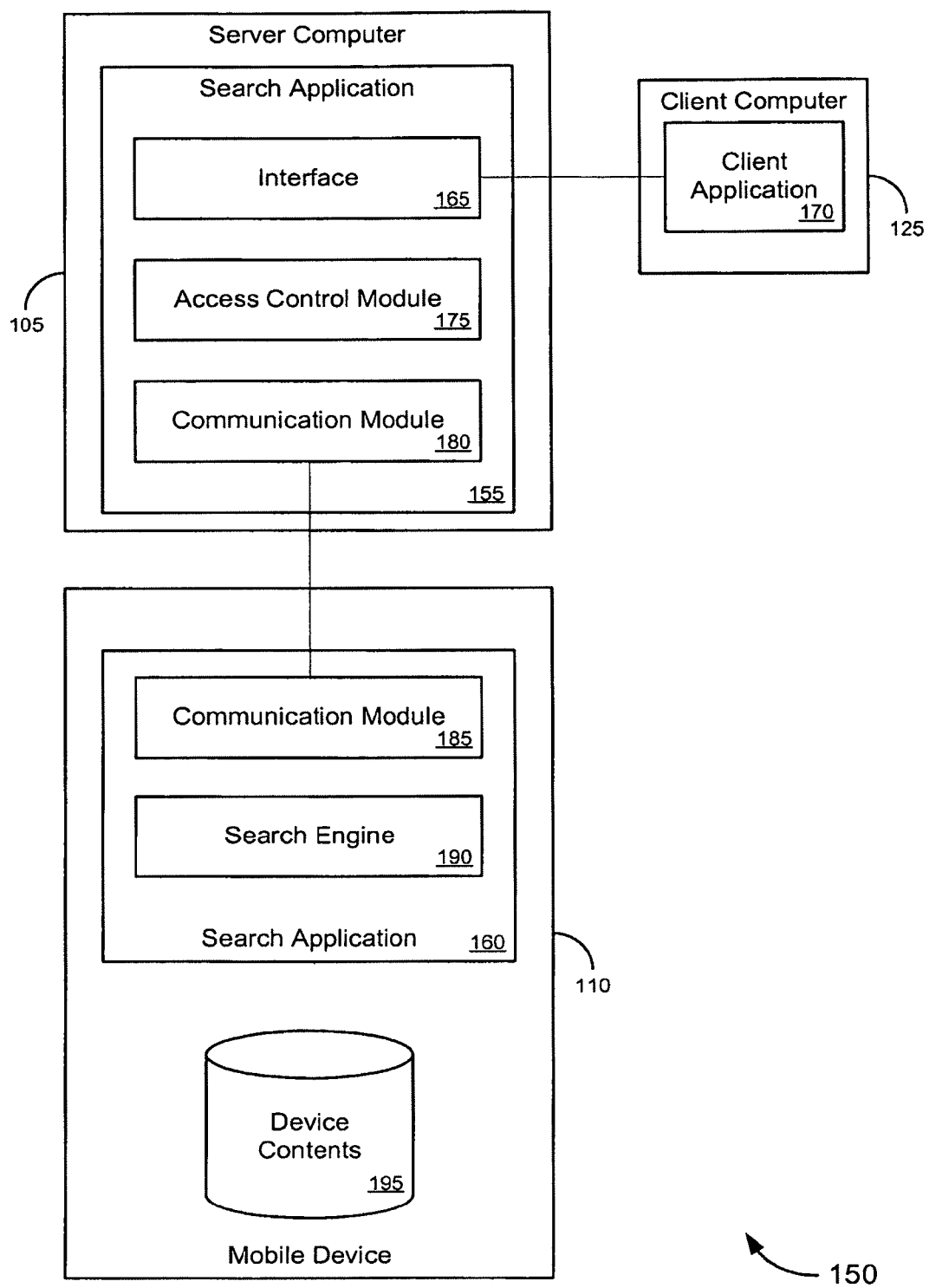
FIG. 1B is a functional block diagram illustrating the functional components of various devices in the system of FIG. 1A.

FIG. 1B provides a functional illustration 150 of one possible relationship between the server 105, a mobile device 110 and a client 125 for providing search services. (For purposes of the invention, it generally does not matter whether the mobile device 110 has a direct connection with the server 105 or instead connects through a host PC). The search server 105 comprises a server component of a search application 155, and the mobile device comprises a mobile component 160 of the search application.

The server component of the search application 155 includes an interface 165 for communicating with a client application 170 on the client 125. In some cases, the interface 165 might comprise a web server (in which case the client application 170 is likely to be a web browser). In other cases, the search application 155 might be a client-server application, in which case the client application 170 might be a dedicated application for interfacing with the search application 155. Merely by way of example, the search application 155 might be an enterprise search service that operates in conjunction with a database server application, and the client application 170 might be a database client. Other configurations are possible as well. Merely by way of example, in some cases, search services might be provided by an email server, in which case the search application 155 might be a component of (or plug-in for) a mail server, and the client application 170 might be a mail client. Those skilled in the art will appreciate that a variety of configurations are possible within the scope of the invention. The interface 165, then, is configured to accept search requests and/or provide search results to the client application 170.

In some cases, the search application 155 includes an access control module 175, which can be used to authenticate a user of the client application 170 (and/or, the client application 170 itself, for example, if the client application 170 is an automated process) and/or determine whether the user has sufficient access rights (i.e., is authorized) to perform the requested search and/or provide any necessary targeted connection metadata (merely by way of example, ODBC connection strings). The search application 155 also features a communication module 180 that is configured to communicate (perhaps using facilities, such as a communication interface and/or network stack, provided by the hardware and/or operating system of the server computer 105).

The mobile component 160 of the search application also includes a communication module 185, which is configured to communicate (again, perhaps using communication facilities, such as a communication interface and/or network stack, provided by the hardware and/or operating system of the mobile device 110 and/or a host PC with which the mobile device is connected) with the communication module 180 on the server 105. The mobile component 160 also includes a search engine 190 that is configured to search the contents 195 of the mobile device.

In a specific embodiment, either the server component 155 and/or the mobile component 160 of the search application can be supplied by a distributed database application, such as the Oracle Database Lite™ product available from Oracle Corp. Such a distributed database product (or, for that matter, a search application of any nature) might provide a variety of services, including for example, a "wake on ring" service, wherein the mobile device 110 (and/or software installed thereon, such as a search application and/or a database application) is activated upon receiving an alert signal (using any of a variety of transports, as described in more detail below). Furthermore, a distributed database application might be configured to provide the searching of device contents 190, the communication between the server 105 and the device 110, and/or targeted metadata connection info (for example, cached ODBC connection strings).

Figure 2:
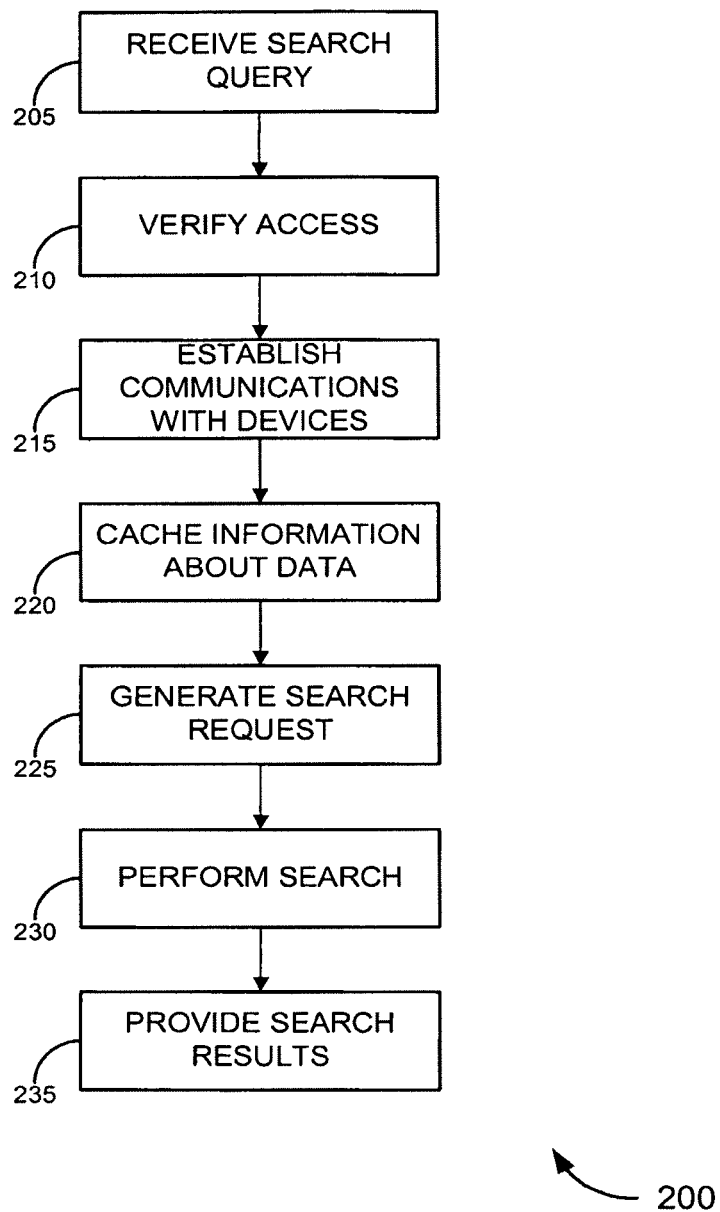
FIG. 2 is a process flow diagram illustrating a method of searching information on a mobile device, in accordance with various embodiments of the invention.

FIG. 2 illustrates an exemplary method 200 of providing search services for a mobile device. The method 200 can be implemented within the systems 100 and 150 described above, although the method is not limited to any particular structural embodiment. (Similarly, the systems described above might be configured to implement methods other than the exemplary methods specifically described herein.). This exemplary method 200 comprises receiving a search query (block 205), e.g., by presenting a search request interface to the user or other entity. As noted above, in some cases, a search server will include (and/or be in communication with) a web server, and a web interface (e.g., a web page) might be used to allow a user to provide a search query via a web browser, which would be received by the web server and provided to a search application. In other embodiments, as mentioned above, a dedicated client application might be used to provide an interface for search queries. In a particular set of embodiments, the search application might receive a search from another application and/or automated process (as opposed to from a user), perhaps through an application programming interface ("API") provided for that purposes. Based on these examples, one skilled in the art will appreciate that a variety of means might be used to receive a search query.

A variety of search facilities and/or strategies (such as keyword searches, natural language searches, etc) are known, and any of them may be implemented in accordance with various embodiments of the invention. In an embodiment, the invention can be implemented, for example as a option, within an existing enterprise search application. Merely by way of example, within an interface for an enterprise search application, the user might be given an option (via a checkbox, etc.) to include mobile devices in an enterprise search. Alternatively and/or additionally, embodiments of the invention can be used to search only mobile devices, exclusive of other enterprise data sources.

In some embodiments, the user (or any other entity performing the searching, such as an application, process, etc.) can be presented with a number of options to refine the search. Merely by way of example, the user can be given the option to specify (perhaps by selecting from a list) which mobile devices (and/or groups of devices) to search. For instance, the system might maintain some metadata about devices, such as the owner of the device, the location and/or department in which the owner works, database connection strings, etc., and this information can be presented to the user to allow the user to define the search universe.

At block 210, the system optionally verifies that the user (or other entity) has sufficient access rights to perform the search (and/or to receive the results of the search). This procedure can be performed at any appropriate point. Merely by way of example, in some cases the entity will be required to log into the search application before being presented with the search query interface. In other embodiments, the user might be allowed to submit the search query, and, perhaps depending on the search terms and/or the definition of the search universe, might be required at that point to provide authorization credentials. In still other embodiments, authorization might be required after the search results have been received by the server, perhaps based on the nature of the search results, e.g., as indicated by the metadata associated with one or more of the search results.

A variety of mechanisms can be used verify the user's access rights. Merely by way of example, the search application might include an authentication system, in which the user (or other entity) provides credentials (such as userid/password, etc.), which are evaluated to authenticate the user, and/or an access control list, which can be evaluated to determine an authenticated user's access rights. In other embodiments, as noted above, the search application might rely on an external authentication/authorization facility (which might be provided by the server's operating system, a web-based logon system, and/or the like.) Many such facilities are known in the art, and embodiments of the invention can rely on such facilities as appropriate.

Figure 3:
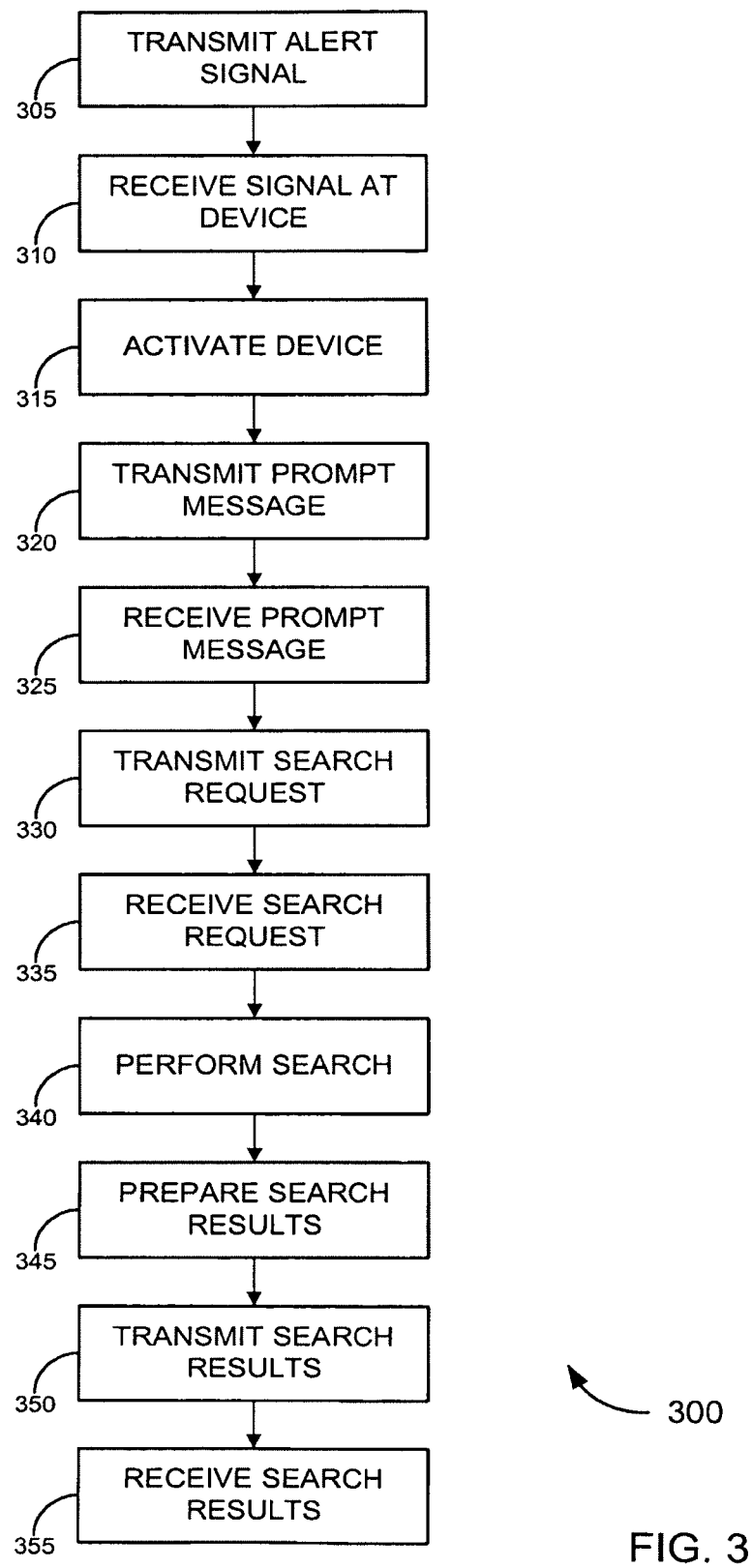
FIG. 3 is a process flow diagram illustrating an exemplary communication process between a search server and a mobile device, in accordance with various embodiments of the invention.

At block 215, the search server establishes communications with the mobile device(s) to be searched. As noted below, the search server and the mobile device generally will both comprise a communication interface, and those interfaces can be used to establish communications between the search server and the mobile device. Also as noted below, the type of communication between the server and the mobile device generally will depend on the capabilities of the mobile device, and various embodiments of the invention can support a variety of different communication types. Merely by way of example, if the mobile device is a wireless phone, establishing communication might comprise transmitting a short messaging service ("SMS") message to the wireless phone. In other embodiments, the server might establish IP communications with the mobile device. In particular embodiments, for example, the communications between the server and the mobile device might comprise a series of HTTP messages. As noted above, in some cases, the communication between the server and the mobile device might comprise a communication path via a host computer (such as a host PC) in communication with the mobile device. FIG. 3, discussed below, illustrates in further detail an exemplary communication process between a server and a mobile device.

In some cases, the server optionally will cache information about data on one or more of the mobile devices (block 220). Merely by way of example, the server might store (in a database, for example) information about the files and/or other data, including for example, metadata about the files/data. This database (or other data store) might reside on a data storage device (such as a hard disk, disk array, etc.) on the server and/or in communication with the server. In other words, the data storage device holding the database/data store might be remote from the mobile devices themselves. In a set of embodiments, the server will obtain current information about the contents of mobile devices (e.g., by periodically polling mobile devices and/or by receiving notifications from mobile devices when their contents have changes) and use it to update the cached information. In some embodiments, the information about the data might include copies or replicas of the files and/or data themselves, although this possibly can increase communication and storage overhead beyond acceptable thresholds.

At block 225, the server generates a search request, based on the search query. Generating the search request typically will comprise parsing the search query, determining the devices to which the search query applies, and preparing a search request that will be used to perform the search. As noted below, in many cases, performing the search comprises transmitting search requests to one or more mobile devices. In some cases, generating the search request might comprise preparing one or more search messages in a format compatible with the devices to be searched. In some cases, a single search request might be suitable for multiple devices (and, accordingly might be capable of being broadcast to the devices). In other cases, each of the devices to be searched might require a request message in a different format. Merely by way of example, a search request transmitted to a phone via SMS might have different format than a request transmitted to a PDA via a host PC, etc.

At block 230, the server performs the search. In some cases (for example, implementations in which the information about device contents is cached), the search might be run against this cached information. In other cases, however, performing the search comprises transmitting a search request to each mobile device to be searched. (FIG. 3, described below, provides a detailed of this process in accordance with a set of embodiments.) In such cases, performing the search might also comprise receiving a set of search results from each of the devices to which the search request was transmitted, and optionally compiling the search results from a plurality of devices in to a composite set of search results.

Embodiments of the invention can search for a variety of different data. Merely by way of example, documents and/or files on mobile devices can be searched. In addition, email messages (and, in particular, local email messages), database records, and other types of data can be searched as well. Methods of searching such disparate types of data are well known in the art, and any of a variety of such methods can be used to search device contents in accordance with embodiments of the invention.

These search results are then provided (block 235), generally to the entity from whom the search request was received by the server. In a set of embodiments, the search results might be provided via a web page and/or via an interface provided by a dedicated client application (in the case of a user requesting the search) and/or via an API (in the case of an application or other process requesting the search. A more detailed description of a process for providing the search results is discussed with respect to FIG. 4, below.

FIG. 3. illustrates an exemplary method 300 for communicating with a mobile device, in accordance with one set of embodiments. The method 300 can provide for establishing communication with the mobile device and/or for performing a search of information about data on a mobile device. Hence various procedures of this method 300 can be, but need not be, incorporated at appropriate points in the method 200 described above.

The method 300 comprises transmitting an alert signal (block 305) (usually, but not always, from the search server) for reception by one or more mobile devices. The transport mechanism for sending the alert often will vary depending on the nature of the mobile device. Merely by way of example, as noted above, if the mobile device is a wireless phone, the alert signal might be transmitted as an SMS message. In other embodiments (for wireless phones as well as other mobile devices), the alert signal might be an IP communication, for example, a set of one or more IP packets directed to a particular IP port at the mobile device. In cases in which a search is directed to a plurality of mobile devices, different types of alert signals might be sent to the various mobile devices, in accordance with their capabilities.

In some cases, the device might be configured with "wake on ring" (or similarly, "wake on LAN") functionality, in which the alert message serves to activate the device. Hence, upon receiving the alert signal (block 310), the search application on the device (and/or another application operating in conjunction with the search application) will activate the device (block 315).

In a particular set of embodiments, the device is configured to sent a prompt message (block 320) to the server to inform the server that the device is ready to receive the search request. In some cases, the prompt message is an HTTP request message directed to the server. In other words, the mobile device might be configured to establish an HTTP session with the server (and, more specifically, a web server application running on the server). In an aspect, this web server application is incorporated within and/or operates in conjunction with the server component of the search application.

At block 330, the server transmits the search request. As noted above, any of a variety of communication transports can be used to transmit the search request. In some cases, the search request is transmitted directly to the mobile device, while in other cases, the search request is transmitted via a host PC. In some embodiments, the search request is transmitted responsive to the prompt message received from the mobile device. Merely by way of example, in some embodiments, as noted above, the prompt message is formatted as an HTTP request. In such embodiments, the search request might be formatted as an HTTP response that is responsive to the prompt messages. In other embodiments, however, the server might not be configured to send an alert signal or receive a prompt message (e.g., blocks 305-325 might be omitted). In such embodiments, the search request might be the initial communication (at least within the context of the present search) between the search server and the mobile device.

Upon receiving the search request (block 335), the mobile component of the search application performs a search of the device contents, using the search terms in the search request as criteria for the search. As noted above, a variety of search engine technologies are known in the art, and any appropriate technology can be used to perform the search of the device contents, which can include files, database records, email messages, and/or other data, depending on the embodiment.

As noted above, in some embodiments, the system will store a variety of metadata about mobile devices, data sources on a particular mobile device, and/or the like. This metadata can include a variety of information. Merely by way of example, the search server might maintain metadata about various data sources on each device (such as different databases that can be searched, etc.), as well, in some cases, as cached connection information (such as login credentials etc.). In another embodiment, however, the connection cache might be maintained within the search application at the mobile device, such that the server need only send the search request (and, optionally the desired data source(s)) to the mobile device, and the search application would handle the connection to the data source, based perhaps on cached connection strings. To illustrate, consider a mobile device that has one or more databases in different formats. The mobile component of the search application might register each of the mobile databases (as well as other data sources, such as a file system, local email store, etc.). This registration likely would include authentication credentials (as necessary) for each data source as well as connection methods (such as ODBC, JDBC, and/or any other standard or proprietary connection method) when applicable. The mobile component of the search application, upon receiving a search request, would establish a connection with each desired data source, and then perform the search using the appropriate connection and/or search tools (which might be SQL statements, keyword searches, and/or the like).

In an embodiment of the invention, the search application (and specifically, either the mobile component and/or the server component, depending on the implementation) is configured to translate between various search methodologies. Merely by way of example, the user interface for the search application might accept keyword searches, since that is a search method familiar to most users. However, various data sources might not support keyword searches, but might instead require, for example, SQL queries. In an embodiment, as noted above, the mobile component of the search application, having registered a data source, then might be configured to transform the keyword search into a SQL query, if that is the search methodology supported by the data source. (In this way, for example, a single search request from the server might be transformed into several different search methodologies for various data sources on one or more mobile devices.) It should be noted that this transformation might also be performed at the server level, such that multiple search requests are transmitted, based on a single search query submitted by the user. It should also be noted that the inverse of this example is possible as well: In a case in which the search server is part of a database application (and/or is configured to receive queries via an API from a database application), it might be designed to receive, for example, SQL queries, and the search application (either at the server and/or on the mobile device) might be configured to transform this query into a keyword search (or any other applicable search methodology).

After performing the search, the mobile component of the search application prepares a set of search results comprising files and/or other data that meet the search criteria (block 345). In a set of embodiments, the search results might be formatted as an HTML document (or other appropriate format) comprising a link corresponding to each file and/or data meeting the search criteria. In addition, metadata about each search result might be included in the set of results. The search results are then transmitted to the server (block 350).

Upon receiving the set of search results (block 355), the server might provide the set of results to the requesting entity, for example as detailed above. In some embodiments, the search results might be provided to the requesting entity in the form provided by the mobile device. In other embodiments, the server might be configured to reformat the search results for presentation to the requesting entity.

Figure 4:
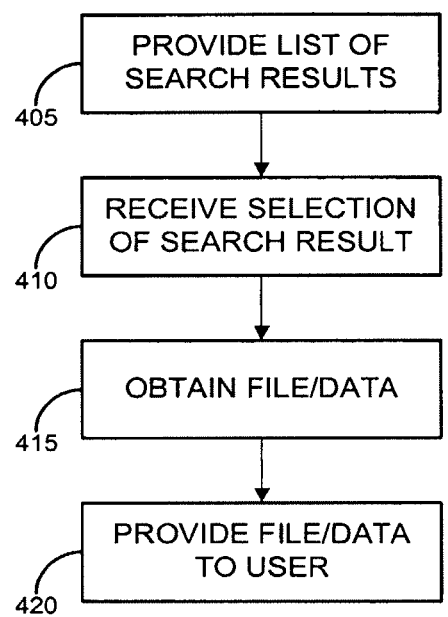
FIG. 4 is a process flow diagram illustrating an exemplary method of providing a set of search results to a user, in accordance with various embodiments of the invention.

FIG. 4 illustrates one exemplary method 400 of presenting a set of search results to a requesting user. The method, in some cases, comprises providing a list of the results (block 405). As noted above, in some cases, the results might be provided via a web interface (e.g., as a web page), and/or each result (i.e., each document or other data meeting the search criteria) might be presented as a hyperlink that can be selected by a user. As noted above, a web browser can be used as the interface for presenting the set of search results, a dedicated client application can be used as the interface, and other possibilities exist as well.

As already described, a set of information about each of the search results might be provided. Merely by way of example, the set of search results might comprise a list of files stored on one or more mobile device(s), as well, in some cases, a set of information (i.e., metadata) about each of the files. Such metadata can include, merely by way of example, a creation date of the file, a size of the file, a location of the file, a device identifier corresponding to a mobile device on which the file is located, an owner of a mobile device on which the file is located, data type (e.g., file, database result, email message, etc.), and/or a date of last access of the file.

At block 410, the server receives from the user a selection of a particular search result, which might correspond to a particular file and/or set of data stored on a mobile device. In a particular embodiment, the user might select a link from the list of search results. The selection of this link might result in a web browser request (e.g., an HTTP GET request) from the user's browser relating to the file. In response, the server obtains the file/data corresponding to the selection (block 415).

At block 415, the server obtains the file/data corresponding to the selection. In many cases, the server will communicate with the mobile device to obtain the file, for example, by issuing an HTTP request to the mobile device. In other cases (for example, if the file/data has been cached at the server, either during a pre-caching operation as described above, or in response to another request for the file/data), the file/data might be obtained from a data store remote from the mobile device.

At block 420, the file/data is provided to the user. In a set of embodiments, the server provides the file/data to the user after it has been obtained (e.g., from the mobile device and/or from cached storage). Merely by way of example, the server might transmit the file/data for reception by the web browser (e.g., as a binary object in a conventional manner) in response to the user selecting the link corresponding to the file/data. In another set of embodiments, the file might be provided by providing the user with a link (e.g., the link in the set of results) that directly links to the file on the mobile device. Hence, in such embodiments, the links provided in the set of results might actually be references to the file/data located on the mobile device.

Figure 5:
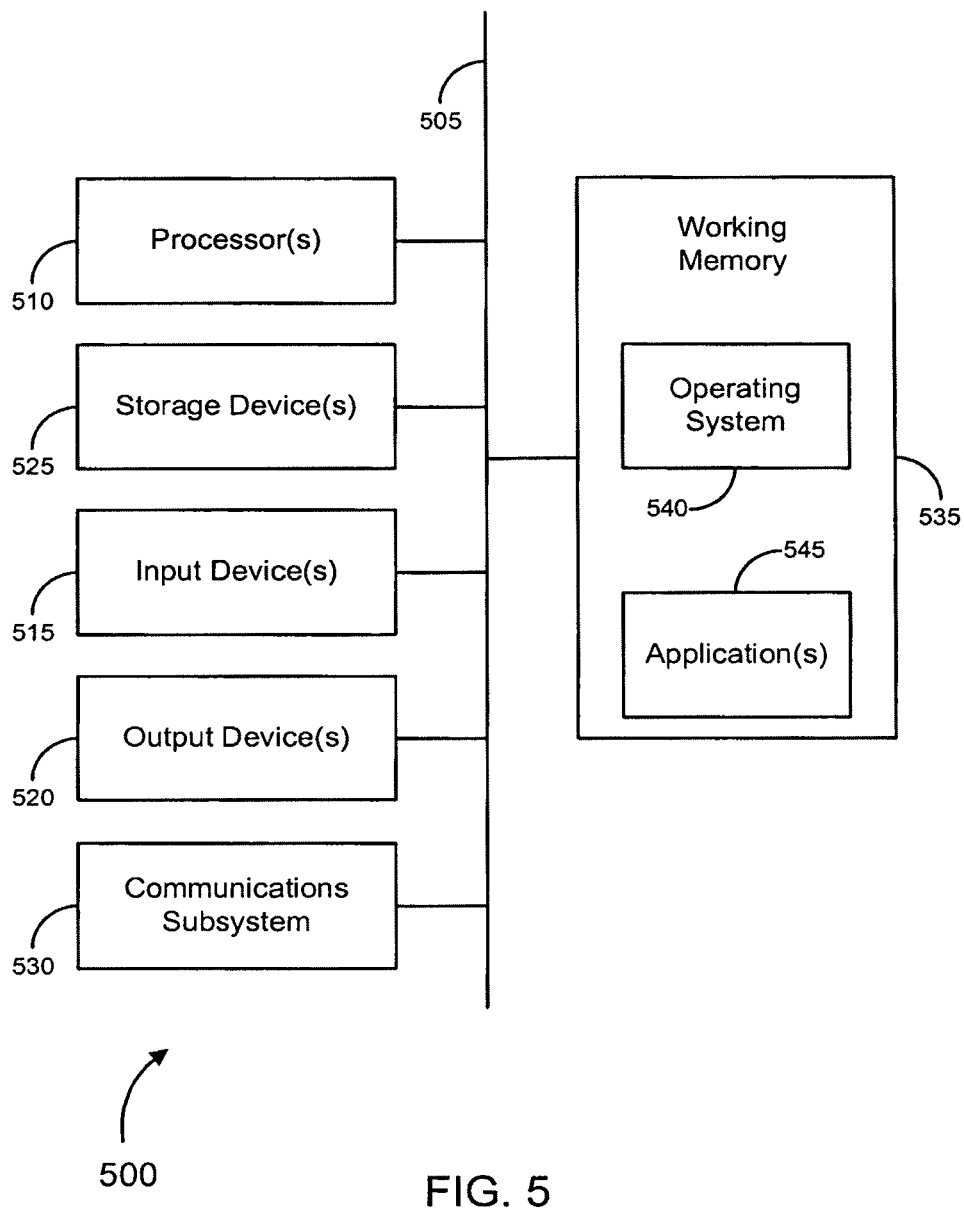
FIG. 5 is a generalized schematic diagram showing a hardware architecture of a computer system that can be used in various embodiments of the invention.

FIG. 5 provides a schematic illustration of one embodiment of a computer system 500 that can perform the methods of the invention and/or the functions web server, search server, mobile device, and/or client computer, as described herein. One skilled in the art will appreciate that the implementation of the various components described with respect to FIG. 5 will vary depending on the type of system (e.g., server or mobile device). Hence, it should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner. The computer system 500 is shown comprising hardware elements that can electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like.

The computer system 500 might also include a communications subsystem 530; which can include without limitation a modem, a network card (wireless or wired), an infra-red communication device, and/or the like), a wireless communication device and/or chipset (such as a Bluetooth™ device, an 802.11 device, a WiFi device, a WiMax device, cellular communication facilities, etc.). The communications system 530 include a communication interface that permits communication with other devices in accordance with embodiments of the invention. In particular, the communication interface may permit data to be exchanged with other devices, either via an immediate connection (such as a serial, USB, Bluetooth and/or infrared connection) and/or via with a network (such as the network 600 described below). The communication interface can include any necessary communication hardware and/or software (such as network software, device drivers, etc.) necessary to provide inter-device communication. The nature of this hardware and/or software often will vary according to the implementation of the invention. Merely by way of example, with respect to some mobile devices, the communication interface might include a wireless radio (such as a CDMA radio, a GSM radio, and 802.11 xx radio, etc.). Other communication hardware, such as communication ports (e.g., Ethernet ports, serial ports) and/or cables might be provided various devices, depending on the type of communications implemented in the embodiments. Based on the disclosure herein, one skilled in the art will appreciated that the invention can accommodate any of a variety of available communication interfaces, and that the choice of such interfaces are discretionary.

In many embodiments, the computer system 500 will further comprise a memory 535, which can include a RAM or ROM device, as described above. The computer system 500 also can comprise software elements, shown as being currently located within a working memory 535, including an operating system 540 and/or other code 545, such as one or more application programs, which may comprise computer programs of the invention and/or may be designed to implement methods of the invention, as described herein. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 6:
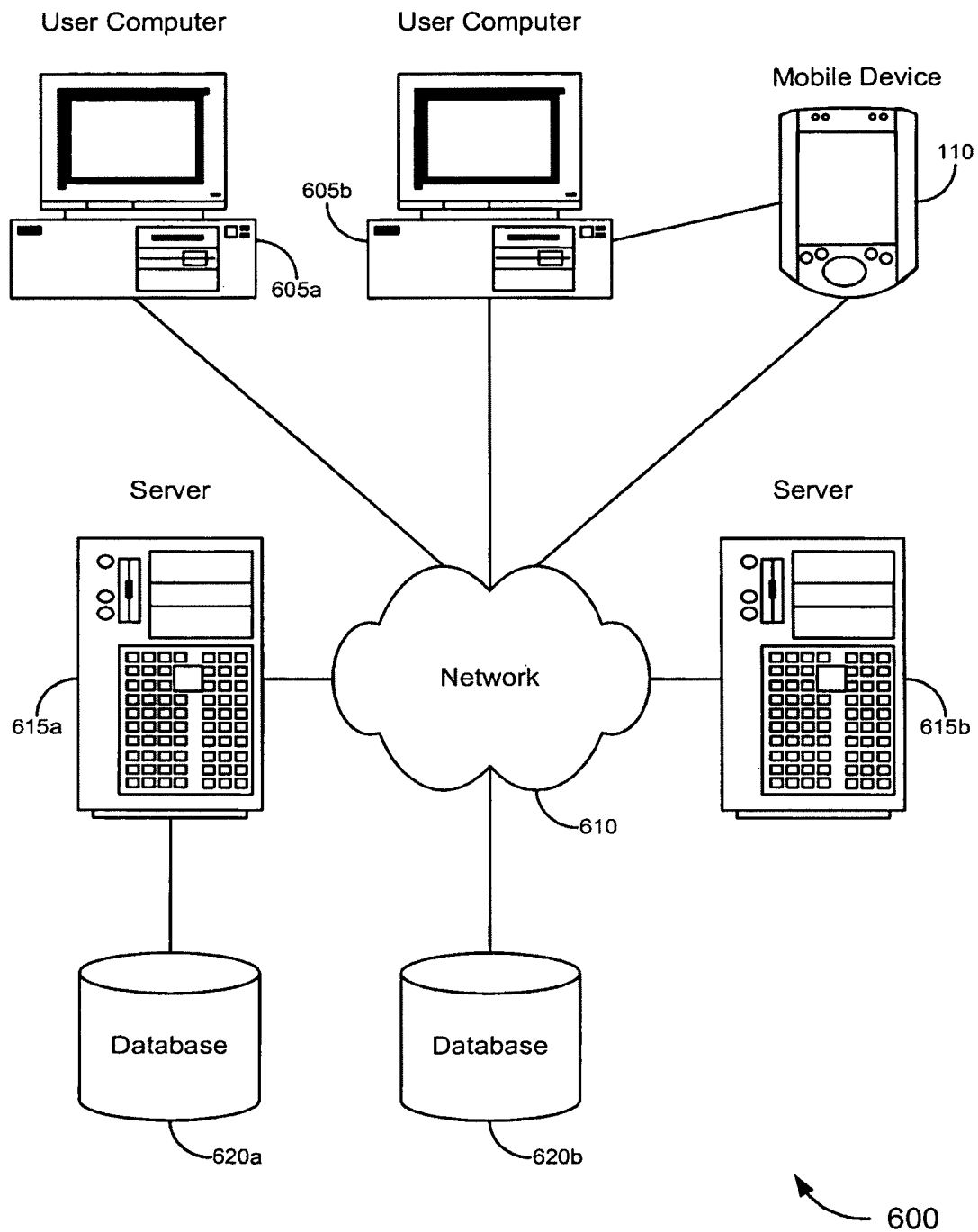
FIG. 6 is a network diagram illustrating an exemplary network that can be used to provide search services in accordance with various embodiments of the invention.

As noted above, a set of embodiments comprises systems for searching mobile devices FIG. 6 illustrates a schematic diagram of a networked system 600 that can be used in accordance with one set of embodiments. The system 600 can include one or more user computers 605. The user computers 605 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 605 can also have any of a variety of applications, such as database client applications, search client applications, web browser applications, and/or the like, which can be used in accordance with embodiments of the invention. Alternatively, the user computers 605 can be any other electronic device, such as a thin-client computer, Internet-enabled mobile telephone, and/or personal digital assistant, capable of communicating via a network (e.g., the network 610 described below) and/or displaying and navigating web pages or other types of electronic documents. Although the exemplary system 600 is shown with two user computers, any number of user computers can be supported.

The user computers 605 can be used for a variety of purposes in different embodiments of the invention. Merely by way of example, a first user computer 605a might be used as a search client, e.g., to transmit search queries and/or receive search results, as described in further detail above. Another user computer 605b (which might, in fact be the same user computer 605a) might serve as a host PC and, accordingly, would be used to provide connectivity between a search server 615 and a non-networked mobile device 110, as described above. Accordingly, the user computer 605b might include software (such as synchronization software, etc.) that provides communication with the mobile device 110, as well as software that acts as an intermediary between the mobile device 110 and the search server 615.

Certain embodiments of the invention operate in a networked environment, which can include a network 610. The network 610 can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

In a set of embodiments, the network 610 can provide direct communications between the mobile device 110 and the server(s) 615, such that the device 110 would not need to interface with a host PC to communicate with the server(s). Accordingly, the network 610 might include any necessary network components to provide such communication. Merely by way of example, if the mobile device 110 is a wireless phone, the network 610 might comprise a wireless phone network and/or components thereof (such as base station controllers, mobile switching centers, and/or the like). In other embodiments, the network might include the necessary hardware to support other wireless communications (such as 802.11xx radios and/or the like).

Embodiments of the invention can include one or more server computers 615 (one or more of which might function as the search server 105 described with respect to FIGS. 1A and 1B). Each of the server computers 615 may be configured with an operating system including without limitation any of those discussed above, as well as any commercially-available server operating systems. Each of the servers 615 may also be running one or more applications, which can be configured to provide services to one or more clients 605 and/or other servers 615. Merely by way of example, a server 615 might be running a search application, as described in further detail above.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more file and or/application servers, which can include one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation web applications (which might, in some cases, be configured to perform methods of the invention). Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on a user computer 605 and/or another server 615. In some embodiments, an application server can create web pages dynamically for displaying the information in accordance with embodiments of the invention, such as by providing a search query interface and/or a web page displaying search results. Data provided by an application server may be formatted as web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server.

In accordance with further embodiments, one or more servers 615 can function as a file server and/or can include one or more of the files necessary to implement methods of the invention incorporated by an application running on a user computer 605 and/or another server 615. Alternatively, as those skilled in the art will appreciate, a file server can include all necessary files, allowing such an application to be invoked remotely by a user computer 605 and/or server 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620a might reside on a storage medium local to (and/or resident in) a server 615a (and/or a user computer 605). Alternatively, a database 620b can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 635 can be a relational database, such as an Oracle database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for retrieving information from a mobile device, the system comprising:
    a storage memory; and
    a processor coupled with the storage memory, wherein the storage memory has sets of instructions stored thereon which, when executed by the processor, cause the processor to:
    receive a search query;
    transmit an alert signal to each mobile device in a set of mobile devices via a transport mechanism, wherein for each mobile device in the set of mobile devices the transport mechanism selected corresponds to a type of the respective mobile device, wherein the set of mobile devices are Internet-enabled mobile telephones which are present within an enterprise environment;
    transmit, from an enterprise search service within the enterprise environment, a search request to the set of mobile devices, wherein the search request is based on the search query;
    receive a set of search results from at least one mobile device of the set of mobile devices;
    store the set of search results in a cache;
    periodically poll the set of mobile devices for changes to the set of search results; and
    update the set of search results stored in the cache based on the periodic polling of the set of mobile devices.

2. The system as recited by claim 1, wherein the sets of instructions when further executed by the processor, cause the processor to cache information about data on a storage device remote from the plurality of mobile devices.

3. The system as recited by claim 1, wherein the search request is formatted according to a first search methodology.

4. The system as recited by claim 3, wherein the sets of instructions when further executed by the processor, cause the processor to transform the search request into a second search methodology.

5. The system as recited by claim 1, wherein the sets of instructions when further executed by the processor, cause the processor to:
    receive, from a user, a selection of a particular search result, wherein the particular search result corresponds to a particular file stored on the at least one mobile device; and
    provide the particular file to the user.

6. The system as recited by claim 5, wherein the sets of instructions when further executed by the processor, cause the processor to obtain the particular file.

7. The system as recited in claim 6, wherein the file is obtained from at least one of the plurality of mobile devices.

8. The system as recited in claim 7, wherein providing the set of search results comprises:
    transmitting a web page comprising a collections of links, each of the links corresponding to a file stored on the plurality of mobile devices;
    receiving the selection of the particular search result comprises receiving from a web browser a request corresponding to the particular file; and
    providing the particular file comprises transmitting the particular file for reception by the web browser.

9. The system as recited in claim 1, wherein the received search query specifies a particular one or more mobile devices to be searched, and further comprising performing a search of information about data stored on each of the particular one or more mobile devices.

10. The system as recited in claim 9, wherein the search query is received from an entity, and wherein the set of instructions further comprises verifying that the entity has sufficient access rights to receive the set of search results.

11. The system as recited in claim 1, wherein the set of search results comprises a list of files stored on the plurality of mobile devices.

12. The system as recited in claim 11, wherein the set of search results further comprises a set of information about each of the files.

13. The system as recited in claim 12, wherein the set of information about each file comprises one or more data elements of the following: a creation date of the file, a size of the file, a location of the file, a device identifier corresponding to the mobile device on which the file is located, an owner of the mobile device on which the file is located, or a date of last access of the file.

14. The system of claim 1, wherein the transport mechanism is a mechanism specific to requirements of the set of mobile devices.

15. The system of claim 1, wherein user preferences are configured to specify which of the set of mobile devices to include in the search request.

16. The system of claim 1, wherein the search request's format matches requirements of the sets of mobile devices.

17. A method of searching information on a mobile device, the method comprising:
receiving a search query, wherein the search query pertains to data stored on at least one mobile device of a set of mobile devices, wherein the set of mobile devices are Internet-enabled mobile telephones which are present within an enterprise environment;
receiving from the at least one mobile device of the set of mobile devices, a set of search results responsive to the search query, the set of search results being generated by at least one search application component on the at least one mobile device;
storing the set of search results in a cache;
waking the at least one mobile device upon receiving a respective alert signal;
maintaining a connection string for a data source on the at least one mobile device;
performing, by an enterprise search service within the enterprise environment, a search of information on the at least one mobile device using the connection string;
preparing a second set of search results based on the search; and
updating the cache with the second set of search results.

18. The method as recited in claim 17, wherein the search query is formatted according to a first search methodology, and wherein the method further comprises transforming the search query into a second search methodology.

19. The method as recited in claim 17, further comprising transmitting the second set of search results, wherein the transmitting of the second set of search results comprises:
transmitting a signal indicating that a search request is pending;
receiving the signal at the at least one mobile device;
transmitting from the at least one mobile device a prompt message; and
responsive to the prompt message, transmitting the search request.

20. The method as recited in claim 19, wherein the prompt message comprises a hypertext transfer protocol ("HTTP") message, and wherein the search request comprises an HTTP response.

21. A non-transitory computer-readable medium having sets of instructions stored thereon which, when executed by a computer, cause the computer to:
receive a search query;
transmit an alert signal to each of a set of mobile devices via a transport mechanism, wherein the transport mechanism corresponds to a type of the respective mobile device, wherein the set of mobile devices are Internet-enabled mobile telephones which are present within an enterprise environment;
transmit, from an enterprise search service within the enterprise environment, a search request to the set of mobile devices, wherein the search request is based on the search query;
receive a set of search results from at least one mobile device of the set of mobile devices;
store the set of search results in a cache;
periodically poll the set of mobile devices for changes to the set of search results; and
update the set of search results stored in the cache based on the periodic polling of the set of mobile devices.

22. The non-transitory computer-readable medium as recited in claim 21, wherein the sets of instructions when further executed by the computer, cause the computer to:
provide, from the cache, the set of search results to a user;
wake a first mobile device upon receiving the respective alert signal; and
receive the search request from a server computer system.

23. The non-transitory computer-readable medium as recited in claim 22, wherein the sets of instructions when further executed by the computer, cause the computer to:
maintain a connection string for a data source on the first mobile device;
perform a search of information on the first mobile device using the connection string;
prepare the set of search results based on the search; and
transmit the set of search results.

* * * * *

UNITED STATES PATENT AND TRADEMARK OFFICE
CERTIFICATE OF CORRECTION

| | | |
|---|---|---|
| PATENT NO. | : 8,650,263 B2 | Page 1 of 1 |
| APPLICATION NO. | : 13/170285 | |
| DATED | : February 11, 2014 | |
| INVENTOR(S) | : Snyder | |

It is certified that error appears in the above-identified patent and that said Letters Patent is hereby corrected as shown below:

On Title page, column 2, under Other Publications, line 3, delete "Interntaional" and insert -- International --, therefor.

In the Specification

In column 14, line 29, delete ""and or/application" and insert -- and/or application --, therefor.

Signed and Sealed this
Eighth Day of July, 2014

Michelle K. Lee
*Deputy Director of the United States Patent and Trademark Office*